United States Patent Office 3,079,557
Patented Feb. 26, 1963

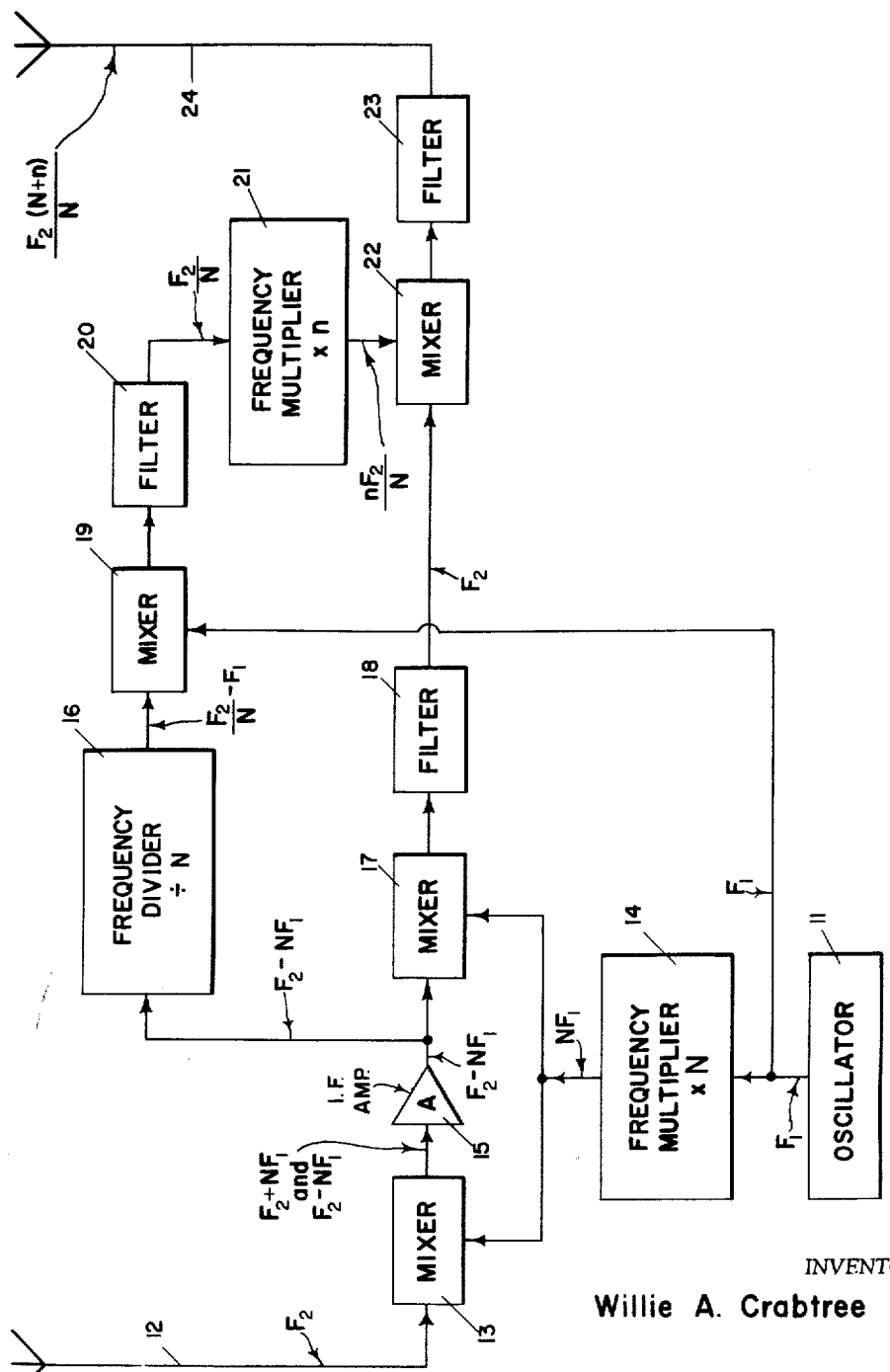

3,079,557
TRANSPONDER
Willie A. Crabtree, Dallas, Tex., assignor to Texas Instruments Incorporated, Dallas Tex., a corporation of Delaware
Filed Nov. 2, 1960, Ser. No. 66,757
6 Claims. (Cl. 325—9)

This invention relates to a transponder circuit which produces an output frequency which is an exact predetermined multiple of the input frequency.

Transponders are circuits which are designed to transmit a radio signal in response to an interrogating radio signal. In its usual application a transponder is mounted on a vehicle such as a missile or aircraft and is used in conjunction with ground equipment which transmits an interrogation signal to the transponder. This interrogation signal is detected by the transponder, which in response thereto transmits a signal. This transmitted signal from the transponder is in turn detected by the ground equipment. The detected signal may be used to provide an indication of the position of the vehicle on which it is mounted or to identify the vehicle.

One system which uses transponders to determine a missile position and velocity is referred to as UDOP (ultra high frequency doppler and position) tracking. In this system, the transponder must transmit a frequency which has a constant relation to the interrogating or keying signal so that change in the doppler frequency can be utilized in conjunction with the ground transmitter to indicate instantaneous position and velocity. If the constant relation is not maintained, erroneous doppler frequency indications of instantaneous velocity will be received by the ground station.

For doppler frequency determinations of instantaneous position and velocity, it would be theoretically possible to provide a transponder which comprises only a receiving antenna, an amplifier connected to receive the signal detected by the receiving antenna, and a transmitting antenna connected to transmit the output signal from the amplifier. However, such a transponder would tend to pick up its own transmitted signal and would continuously transmit its output signal without receiving any interrogation signal from the ground equipment. This phenomenon is referred to as "singing." To prevent "singing," transponders are usually designed to transmit at a different frequency than the interrogation signal and the transponder circuit is tuned to operate in response to signals within a bandwidth not inclusive of the frequency of the output signal of the transponder. This frequency change could be effected by means of a frequency divider or frequency multiplier and the necessary tuning could be effected by means of a filter. However, such a circuit would require the transponder to have a high frequency amplifier which would amplify at the frequency of the detected interrogation signal. Such high frequency amplifiers are undesirable because of their complexity and expense.

A more practical transponder, and the one commonly used in the prior art comprises a local oscillator, the output of which is mixed with the detected interrogation signal to provide an IF signal. The IF signal is amplified in an IF amplifier, which is tuned to eliminate spurious undesirable signals. The output of the IF amplifier then is converted back to a high frequency different from the frequency of the interrogation signal and transmitted. Transponders of this type have a disadvantage in that the transmitted frequency is dependent on the local oscillator frequency and any drift in the local oscillator will cause a drift in the transmitted frequency.

It is the main object of the present invention to provide a simple transponder circuit which is not subject to any drift even though the local oscillator frequency drifts. This is accomplished by making the output signal frequency independent of the local oscillator frequency. Because the system of the present invention is not subject to drift in output frequency, the output frequency may be and is designed near enough to the interrogation signal frequency to simplify the ground equipment by eliminating the requirement of a separate receiving antenna and a widely different receiver for the signals transmitted by the transponder.

A system of the prior art dealing with this same problem attempts to solve it by controlling the local oscillator frequency with the frequency of the interrogation signal. When the local oscillator starts to drift a negative feedback signal is developed from a comparison of the oscillator frequency with the interrogation signal frequency and this negative feedback signal is applied to the local oscillator to correct the drift. This system is inferior to the system of the present invention because it is much more complicated and because it is an error system. The fact that it is an error system requires that there be some local oscillator drift before there can be a correction. Therefore the local oscillator drift can never be entirely eliminated. The system of the present invention not only is much simpler than this system of the prior art but also, since the output frequency is independent of the local oscillator frequency, it entirely eliminates any drift in output frequency.

According to the invention the interrogation signal is combined in a first mixer with a predetermined multiple of the local oscillator frequency to provide the intermediate frequency, which is amplified by an IF amplifier. The output of the IF amplifier is combined in a second mixer with the same predetermined multiple of the local oscillator frequency to provide a signal having a frequency precisely the same as that of the interrogation signal. The output of the amplifier is also applied to a frequency divider, which divides by a factor equal to the aforesaid predetermined multiple. The output of the frequency divider is combined in a third mixer with the output signal of the local oscillator and the resulting sum component in the output signal of the third mixer resulting from this mixing will be independent of the local oscillator frequency. This sum component is applied to a frequency multiplier, the output of which is combined in a fourth mixer with the frequency of the interrogation signal derived from the output of the second mixer. The sum component in the output signal of the fourth mixer is transmitted as the output signal of the transponder. This output signal will have a frequency entirely independent of the local oscillator frequency, and the output signal frequency of the transponder may be and is designed to be close to the interrogation signal frequency, thus making simpler ground equipment possible.

Further objects and advantages of the present invention will become readily apparent as the following detailed description of the invention unfolds and when taken in conjunction with the single FIGURE of the drawings, which shows a block diagram of the transponder of the present invention.

As shown in the drawing, the transponder comprises an oscillator 11, which generates an output signal having a frequency which shall be designated as $F_1$. The interrogation signal or input signal to the transponder is detected by an antenna 12 and the frequency of this signal shall be designated by the reference number $F_2$. The input signal detected by the antenna 12 is applied to a mixer 13. The output signal of the oscillator 11 is applied to a frequency multiplier 14, which multiplies by a factor N. The output of the frequency multiplier will therefore be $NF_1$. The output signal of the frequency multiplier is mixed with the input signal detected by the antenna 12 in the mixer 13. The mixer 13 will therefore produce an output signal having sum and difference components, the sum components having a frequency equal to the sum of the frequencies of the interrogation signal and the output signal of the frequency multiplier 14, and the difference component having a frequency equal to the frequency difference between these two signals. The frequency of the diffence component, therefore, will be $F_2-NF_1$. The output signal of the mixer 13 is applied to an IF amplifier 15. The IF amplifier 15 is tuned to amplify only the difference component in the output signal of the mixer 13 having the frequency $F_2-NF_1$ and it filters out the sum component in the output signal of the mixer 13. Thus the amplified output signal of the amplifier 15 will have a frequency of $F_2-NF_1$. The output of the amplifier 15 is applied to a frequency divider 16 and to a mixer 17. The frequency divider 16 has a division factor of N equal to the multiplication factor of the frequency multiplier 14, so that the frequency of the output signal produced by the frequency divider will be $F_2/N-F_1$. The output signal of the frequency multiplier 14 is also applied to the mixer 17. The sum component in the output signal of the mixer 17 resulting from the mixing of the frequencies of $NF_1$ and $F_2-NF_1$ will have a frequency of $F_2$. The output of the mixer 17 is applied to a filter 18 which is designed to filter out the difference component in the output signal of the mixer 17 and pass the sum component having the frequency $F_2$. Thus the out put signal of the filter 18 has a frequency $F_2$ equal to the frequency of the interrogation signal detected by the antenna 12. The output signal of the frequency divider 16 having a frequency $F_2/N-F_1$ is applied to a mixer 19. The output of the oscillator 11 is mixed with the output signal of the frequency divider 16 in the mixer 19. The resulting sum component in the output signal of the mixer 19 resulting from the mixing of frequencies $F_1$ and $F_2/N-F_1$ will have a frequency of $F_2/N$. The output signal of the mixer 19 is applied to a filter 20 which is designed to filter out the difference component in the output signal of the mixer 19 and pass only the sum component having the frequency of $F_2/N$. The output signal of the filter 20 is applied to a frequency multiplier 21 having a multiplication factor of $n$. The output signal produced by the frequency multiplier 21 will therefore have a frequency of $nF_2/N$. This output signal is mixed with the output signal of the filter 18 in a mixer 22. The sum component in the output signal of the mixer 22 resulting from the mixing of frequencies $nF_2/N$ and $F_2$ will have a frequency of $F_2(N+n)/N$. The output of the mixer 22 is applied to a filter 23 which is designed to filter out the difference component in the output signal of the mixer 22 and pass only the sum component having the frequency of $F_2(N+n)/N$. The output of the filter 23 is applied to a transmitting antenna 24 of the transponder. Thus the output signal of the transponder has a frequency which is independent of the frequency output of the oscillator 11, depending only upon the input signal frequency detected by the receiving antenna 12 and the multiplication and division factors of the frequency multipliers 14 and 21 and the frequency divider 16. Therefore the frequency of the signal transmitted by the antenna 24 will not be affected by any drift in the frequency of the oscillator 11. The output frequency transmitted by the antenna 24 is closed to the input signal frequency $F_2$, differing from it only by the factor $(N+n)/N$ and thus the use of simplified ground equipment is made possible. The output signal of the transponder of the present invention will not cause singing inasmuch as the output and input frequency of the transponder are separated by an exact frequency differential and no harmonic of the output signal matches the input signal.

It will be noted that the output signal from the filter 18 is equal to the input signal detected by the antenna 12. Thus it would be possible to amplify the input signal directly and apply it to the mixer 22, and the mixer 17 and the filter 18 could be dispensed with. However, this would require a high frequency amplifier in the transponder circuit whereas the system of the preferred embodiment of the invention eliminates the necessity for this high frequency amplifier. It will also be noted that the frequency of the output signal of the filter 20 and of the frequency multiplier 21 are independent of the oscillator frequency. Thus the effect of any drift in the oscillator 11 could be eliminated by transmitting either of these two output signals and the mixer 17, the filter 18, the mixer 22 and the filter 23 could be eliminated. However, the output signal transmitted by such a transponder would not be as close to the frequency of the input signal detected by the antenna 12 and therefore the advantage of simplified ground equipment cooperating with this transponder would be lost.

These and other modifications may be made to the above-described preferred embodiment of the invention without departing from the spirit and scope of the invention, which is limited only as defined in the appended claims.

What is claimed is:

1. A transponder comprising a receiving antenna, an oscillator, a first frequency multiplier connected to multiply the frequency of the output signal of said oscillator by a predetermined factor, a first mixer connected to mix the output signal of said first frequency multiplier and the signal detected by said receiving antenna, an IF amplifier connected to amplify the difference component in the output signal of said first mixer, a frequency divider connected to divide the frequency of the output signal of said IF amplifier by said predetermined factor, a second mixer connected to mix the output signals of said frequency divider and said oscillator, a first filter connected to pass the sum component and filter out the difference component in the output signal of said second mixer, a second frequency multiplier connected to multiply the frequency of the output signal of said first filter, a third mixer connected to mix the output signals of said first frequency multiplier and said IF amplifier, a second filter connected to pass the sum component and filter out the difference component in the output signal of said third mixer, a fourth mixer connected to mix the output signals of said second frequency multiplier and said second filter, a third filter connected to pass the sum component and filter out the difference component in the output signal of said fourth mixer, and a transmitting antenna connected to transmit the output signal of said third filter.

2. A transponder comprising a receiving antenna, an oscillator, a first frequency multiplier connected to multiply the frequency of the output signal of said oscillator by a predetermined factor, a first mixer connected to mix the output signal of said first frequency multiplier and the signal detected by said receiving antenna, an IF amplifier connected to amplify the difference component in the output signal of said first mixer, a frequency divider connected to divide the frequency of the output signal of said IF amplifier by said predetermined factor, a second mixer connected to mix the output signals of said frequency divider and said oscillator, a first filter connected to pass the sum component and filter out the difference component in the output signal of said second mixer, a second frequency multiplier connected to multiply the frequency of the output signal of said first filter, a third mixer connected to mix the frequency of the output signals of said first frequency multiplier and said IF amplifier, a second filter connected to pass the sum component and filter out the difference component in the output signal of said third mixer, a fourth mixer connected to mix the output signals of said second frequency multiplier and said second filter, and means to transmit one of the resulting sum and difference components in the output signal of said fourth mixer.

3. A transponder comprising a receiving antenna, an oscillator, a first frequency multiplier connected to multiply the frequency of the output signal of said oscillator by a predetermined factor, a first mixer connected to mix the output signal of said first frequency multiplier and the signal detected by said receiving antenna, an IF amplifier connected to amplify the difference component in the output signal of said first mixer, a frequency divider connected to divide the frequency of the output signal of said IF amplifier by said predetermined factor, a second mixer connected to mix the output signals of said frequency divider and said oscillator, a first filter connected to pass the sum component and filter out the difference component in the output signal of said second mixer, a second frequency multiplier connected to multiply the frequency of the output signal of said first filter, means responsive to the signal detected by said receiving antenna and the output signal of said second frequency multiplier to produce a signal having frequency components equal to the sum and difference of the frequencies of the signal detected by said receiving antenna and the output signal of said frequency multiplier, and means to transmit one of said components in the output signal of said last-named means.

4. A transponder comprising a receiving antenna, an oscillator, a first frequency multiplier connected to multiply the frequency of the output signal of said oscillator by a predetermined factor, a first mixer connected to mix the output signal of said first frequency multiplier and the signal detected by said receiving antenna, an IF amplifier connected to amplify the difference component in the output signal of said mixer, a frequency divider connected to divide the frequency of the output signal of said IF amplifier by said predetrmined factor, a second mixer connected to mix the output signals of said frequency divider and said oscillator, and means to transmit a signal derived from the resulting sum component in the output signal of said second mixer.

5. A transponder comprising a receiving antenna, a local oscillator, a frequency multiplier connected to multiply the output signal of said oscillator by a predetermined factor, first mixing means responsive to the signal detected by said receiving antenna and the output signal of said frequency multiplier to produce a signal having a frequency equal to the frequency of the signal detected by said antenna minus the frequency of the output signal of said frequency multiplier, a frequency divider connected to divide the frequency of the output signal of said first mixing means by said predetermined factor, a second mixing means responsive to the output signals of said frequency divider and said oscillator to produce an output signal having a frequency equal to the sum of the frequency of the output signals of said frequency divider and said oscillator, and means to transmit a signal derived from the output signal of said second mixing means.

6. A transponder comprising a receiving antenna, first means to generate a signal frequency different than the signal frequency detected by said antenna, second means coupled to said first means to generate a signal frequency correlated with the signal frequency of said first means by a predetermined multiplier, a first mixer means responsive to the signal detected by said antenna and the signal of one of said first means and said second means to produce an output containing at least one of a sum frequency and a difference frequency, means to multiply the output of said first mixer by the ratio of the signal frequency of the other of said first means and said second means to the signal frequency of said one of said first means and said second means, a second mixer responsive to the output of said means to multiply and to the signal frequency of the other of said first means and said second means, said second mixer producing the product of the signal frequency detected by said antenna multiplied by said ratio, and means to transmit a signal derived from the output of said second mixer means.

References Cited in the file of this patent
UNITED STATES PATENTS

| | | |
|---|---|---|
| 2,614,211 | Goodall | Oct. 14, 1952 |
| 2,687,476 | Guanella | Aug. 24, 1954 |